United States Patent
Sato et al.

(10) Patent No.: US 6,560,399 B2
(45) Date of Patent: *May 6, 2003

(54) IMAGE RECORDING AND REPRODUCING DEVICE AND A MEDIUM STORING AN IMAGE RECORDING AND REPRODUCING PROGRAM

(75) Inventors: Yuji Sato, Hamamatsu (JP); Masaaki Okabayashi, Hamamatsu (JP); Eiji Takeuchi, Hamamatsu (JP)

(73) Assignee: Yamaha Corporation, Hamamatsu (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/031,431
(22) Filed: Feb. 26, 1998
(65) Prior Publication Data
US 2002/0001449 A1 Jan. 3, 2002

(30) Foreign Application Priority Data

Feb. 27, 1997 (JP) .............................................. 9-044221
Aug. 25, 1997 (JP) .............................................. 9-227859

(51) Int. Cl.$^7$ ................................................ H04N 9/00
(52) U.S. Cl. ............................................ 386/1; 386/46
(58) Field of Search ........................... 386/1, 4, 46, 52, 386/55, 83, 95, 125, 126; 360/13; 345/328; 434/252; 348/157

(56) References Cited

U.S. PATENT DOCUMENTS

| | | | | |
|---|---|---|---|---|
| 4,685,003 A | * | 8/1987 | Westland | ...................... 386/52 |
| 5,111,410 A | * | 5/1992 | Nakayama et al. | ......... 348/157 |
| 5,333,061 A | * | 7/1994 | Nakashima et al. | .......... 386/52 |
| 5,732,184 A | * | 3/1998 | Chao et al. | .................... 386/55 |
| 5,819,003 A | * | 10/1998 | Hirayama et al. | ............. 386/95 |
| 5,930,445 A | * | 7/1999 | Peters et al. | ................... 386/52 |
| 6,068,559 A | * | 5/2000 | Lubell et al. | ................ 434/252 |

* cited by examiner

Primary Examiner—Thai Tran
Assistant Examiner—Christopher Onuaku
(74) Attorney, Agent, or Firm—Pillsbury Winthrop LLP

(57) ABSTRACT

For enabling simultaneous reproduction of a plurality of dynamic picture image information which have been recorded separately, the plurality of dynamic picture image information are separately recorded in a plurality of storage areas in a DRAM. The plurality of dynamic picture image information are disposed in different display areas on the same screen and reproduced simultaneously with reproduction points of the respective dynamic picture image information being timewise matched by a reproduction point designation section with respect to all of the dynamic picture image information.

2 Claims, 10 Drawing Sheets

|   |   | FIRST BANK |   |   |   |   |   |   |   |   | SECOND BANK |   |   |   |   |
|---|---|---|---|---|---|---|---|---|---|---|---|---|---|---|---|
| A | A | A | A | A | A | A | A | B | B | B | B | B | B | B | B |
| A | A | A | A | A | A | A | A | B | B | B | B | B | B | B | B |
| A | A | A | A | A | A | A | A | B | B | B | B | B | B | B | B |
| A | A | A | A | A | A | A | A | B | B | B | B | B | B | B | B |
| A | A | A | A | A | A | A | A | B | B | B | B | B | B | B | B |
| A | A | A | A | A | A | A | A | B | B | B | B | B | B | B | B |
| A | A | A | A | A | A | A | A | B | B | B | B | B | B | B | B |
| A | A | A | A | A | A | A | A | B | B | B | B | B | B | B | B |

FIG. 5A

| 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| 17 | 18 | 19 | 20 | 21 | 22 | 23 | 24 | 25 | 26 | 27 | 28 | 29 | 30 | 31 | 32 |
| 33 | 34 | 35 | 36 | 37 | 38 | 39 | 40 | 41 | 42 | 43 | 44 | 45 | 46 | 47 | 48 |
| 49 | 50 | 51 | 52 | 53 | 54 | 55 | 56 | 57 | 58 | 59 | 60 | 61 | 62 | 63 | 64 |
| 65 | 66 | 67 | 68 | 69 | 70 | 71 | 72 | 73 | 74 | 75 | 76 | 77 | 78 | 79 | 80 |
| 81 | 82 | 83 | 84 | 85 | 86 | 87 | 88 | 89 | 90 | 91 | 92 | 93 | 94 | 95 | 96 |
| 97 | 98 | 99 | 100 | 101 | 102 | 103 | 104 | 105 | 106 | 107 | 108 | 109 | 110 | 111 | 112 |
| 113 | 114 | 115 | 116 | 117 | 118 | 119 | 120 | 121 | 122 | 123 | 124 | 125 | 126 | 127 | 128 |

FIG. 5B

FIRST FIELD

| A | A | A | A | A | A | A | A | B | B | B | B | B | B | B | B |
|---|---|---|---|---|---|---|---|---|---|---|---|---|---|---|---|
| A | A | A | A | A | A | A | A | B | B | B | B | B | B | B | B |
| A | A | A | A | A | A | A | A | B | B | B | B | B | B | B | B |
| A | A | A | A | A | A | A | A | B | B | B | B | B | B | B | B |
| A | A | A | A | A | A | A | A | B | B | B | B | B | B | B | B |
| A | A | A | A | A | A | A | A | B | B | B | B | B | B | B | B |
| A | A | A | A | A | A | A | A | B | B | B | B | B | B | B | B |
| A | A | A | A | A | A | A | A | B | B | B | B | B | B | B | B |

SECOND FIELD

FIG. 5C

PICTURE OF BANK A    PICTURE OF BANK B

PICTURE OF BANK A    PICTURE OF BANK B

IMAGE RECORDING AND REPRODUCING DEVICE AND A MEDIUM STORING AN IMAGE RECORDING AND REPRODUCING PROGRAM

BACKGROUND OF THE INVENTION

This invention relates to an image recording and reproducing device for recording dynamic picture image information such as one of a video camera or a television onto an image recording storage such as a semiconductor memory and displaying it in multi-picture display and relates also to a medium storing an image recording and reproducing program.

With a rapidly-increasing storage capacity achieved by fine pattern technology for semiconductor memory as well as advancing image compression technology, image recording and reproducing devices have been widely used today which temporarily store image data from a video camera or the like into a semiconductor memory and then reproduce the thus-stored image data from selected locations of the memory at an optional speed. These image recording and reproducing devices are suitable for use in, for example, editing of a TV commercial production and analysis of a form in playing a sport, because of their capability to record a dynamic picture for a period of tens of seconds.

In analysis of a form in playing a sport, it is desirable that, by using a multi-picture display technique on the screen, various pictures of forms taken from different angles should be simultaneously viewed or that a form of a professional person should be compared with one's own form from the same angle. Known in the art of image processing devices having such multi-picture display function are a device which inputs image signals from a plurality of video cameras or video reproducing devices simultaneously and displays these image signals in multi-picture display and also a device which extracts several points of a series of actions taken by a single video camera as still pictures and displays these still pictures in multi-picture display.

Since, however, in the former of the prior art image processing devices having the multi-picture display function, image signals which are input simultaneously from a plurality of video cameras or video reproducing devices are displayed in multi-picture display, a plurality of video cameras or video reproducing devices are required with the result that the device in its entirety becomes costly. Moreover it is difficult to synchronize the pictures of plural video sources with one another when these pictures of plural video sources are respectively independent pictures. In the latter of the prior art image processing devices, still pictures at different reproducing points in a series of actions are displayed in multi-picture display. Therefore it is not possible in this device to reproduce separately recorded image signals in the form of a dynamic picture by matching reproducing points of the respective still pictures.

SUMMARY OF THE INVENTION

It is therefore an object of the present invention to provide an improved image recording and reproducing device which permits simultaneous reproduction of separately recorded dynamic pictures by matching their reproducing timing.

According to the invention, there is provided an image recording and reproducing device comprising: an image storage section which has a plurality of storage areas and stores dynamic picture image information; a recording section which records a plurality of dynamic picture image information separately in the storage areas of said image storage section; a reproducing section which disposes the plurality of dynamic picture image information recorded by said recording section in different display areas and reproduces them simultaneously; and a reproduction point designation section which timewise matches particular reproduction points of the respective dynamic picture image information with respect to all of the dynamic picture image information.

According to the invention, a plurality of dynamic picture image information can be separately stored in the plurality of storage areas of the image storage section, the plurality of recorded dynamic picture image information can be disposed in different display areas on the same screen and can be reproduced simultaneously, and reproduction points of the respective dynamic picture image information can be timewise matched by the reproduction point designation section with respect to all of the dynamic picture image information. Accordingly, for example, pictures of a baseball pitching form taken from different angles or a picture of golf swing by a professional player and a picture of one's own golf swing taken from the same angle can be displayed side by side on the same screen and can be compared with each other by simultaneously reproducing these pictures with a sinchronized timing. Besides, according to the invention, since a plurality of dynamic picture image information which are reproduced simultaneously can be separately recorded in different storage areas of the image storage section, pictures of a form in a sport can be taken in several divided times with a single video camera and it is unnecessary to provide plural video cameras or video reproducing devices.

As for the reproduction point designation section, one which designates at least one of a reproduction start address, a reproduction end address and a desired reproduction point address of the respective dynamic picture image information can be used.

By addressing the reproduction start address of the respective dynamic picture image information, the comparison of the plurality of dynamic picture image information can be focused on the start point of the action. By addressing the reproduction end address, the comparison can be focused on the end point of the action. By addressing the desired reproduction point address, the comparison can be focused on a middle point of the action, e.g., the instant of impact.

As the reproducing section may be used one which simultaneously starts reproduction of the plurality of dynamic picture image information from the reproduction start address of the respective dynamic picture image information designated by the reproduction point designation section and, when there is difference in time length of reproduction between the respective dynamic picture image information, reproduces the dynamic picture image information whose reproduction has been completed as a still picture until reproduction of the dynamic picture image information which has the longest reproduction time is completed. As the reproducing section may also be used one which reproducing section simultaneously starts reproduction of the plurality of dynamic picture image information from the reproduction start address of the respective dynamic picture image information designated by the reproduction point designation section and, when there is difference in time length of reproduction between the respective dynamic picture image information, ends reproduction of all of the dynamic picture image information at a timing when reproduction of the dynamic picture image information which has the shortest reproduction time is completed.

By reproducing, when there is difference in time length of reproduction between the respective dynamic picture image information, the dynamic picture image information whose reproduction has been completed as still picture until reproduction of the dynamic picture image information which has the longest reproduction time is completed, the dynamic picture image information to be reproduced can be reproduced without omission. By ending reproduction of all of the dynamic picture image information at a timing when reproduction of the dynamic picture image information which has the shortest reproduction time is completed, reproduction of the dynamic picture image information which has a longer reproduction time is ended before its reproduction end address arrives but, since both dynamic picture image information are reproduced at the same speed, difference in speed of the actions to be compared can be made clear.

The reproducing section may be one which determines the reproduction start address and the reproduction end address in such a manner that a reproduction timing of the desired reproduction point address designated by the reproduction point designation section coincides among the respective dynamic picture image information.

By this arrangement, a simultaneous reproduction can be realized so that all pictures coincide with one another at a specific instance, e.g., a hitting point in a baseball batting form.

In another aspect of the invention, there is provided an image recording and reproducing device comprising: an image storage section which has a plurality of storage areas and stores dynamic picture image information; a recording section which records a plurality of dynamic picture image information separately in the storage areas of said image storage section; a reproducing section which disposes the plurality of dynamic picture image information recorded by said recording section in different display areas on the same screen and reproduces them simultaneously: and a reproduction point operation section which manually designates reproduction points of the dynamic picture image information reproduced by the reproducing section one by one with respect to the respective dynamic picture image information, or simultaneously with respect to all of the dynamic picture image information.

According to this aspect of the invention, reproduction points of the reproduced dynamic picture image information can be manually designated by the reproduction point operation section either one by one with respect to the respective dynamic picture image information or simultaneously with respect to all of the dynamic picture image information. Accordingly, by manually designating a reproduction point to be matched one by one with respect to the respective dynamic picture image information by the reproduction point operation section and, upon designating all reproduction points, moving the reproduction points of all of the dynamic picture image information simultaneously by a manual operation, plural dynamic picture image information can be reproduced simultaneously at a desired reproduction speed (including reproduction in reverse direction) designated by a manual operation so that a reproduction point which one particularly desires to see can be viewed at a slow speed.

In still another aspect of the invention, there is provided a medium storing an image recording and reproducing program comprising: a recording processing for recording a plurality of dynamic picture image information separately in a plurality of storage areas of an image storage section which stores the dynamic picture image information: a reproducing processing for disposing the plurality of dynamic picture image information recorded by the recording section in different display areas on the same screen and reproduces them simultaneously; and a reproduction point designation processing for timewise matching particular reproduction points of the respective dynamic picture image information with respect to all of the dynamic picture image information.

The reproduction point designation processing may display, on the same screen as the one for the respective dynamic picture image information, an operation window for designation at least one of a reproduction start address, a reproduction end address and a desired reproduction point address of the respective dynamic picture image information and match the reproduction points of the respective dynamic picture image information on the basis of event information supplied from the operation window.

According to this program, an effect which is substantially the same as the first described aspect of the invention can be achieved by a computer software, so that no hardware image recording and reproducing device is required.

BRIEF DESCRIPTION OF THE DRAWINGS

Now, preferred embodiments of the present invention will be described in detail with reference to the accompanying drawings, in which

FIGS. 5A to 5C are diagrams illustrating an example of a method of reading and writing of a memory for multi-picture display by the same device;

DETAILED DESCRIPTION OF PREFERRED EMBODIMENTS

Figure 1:
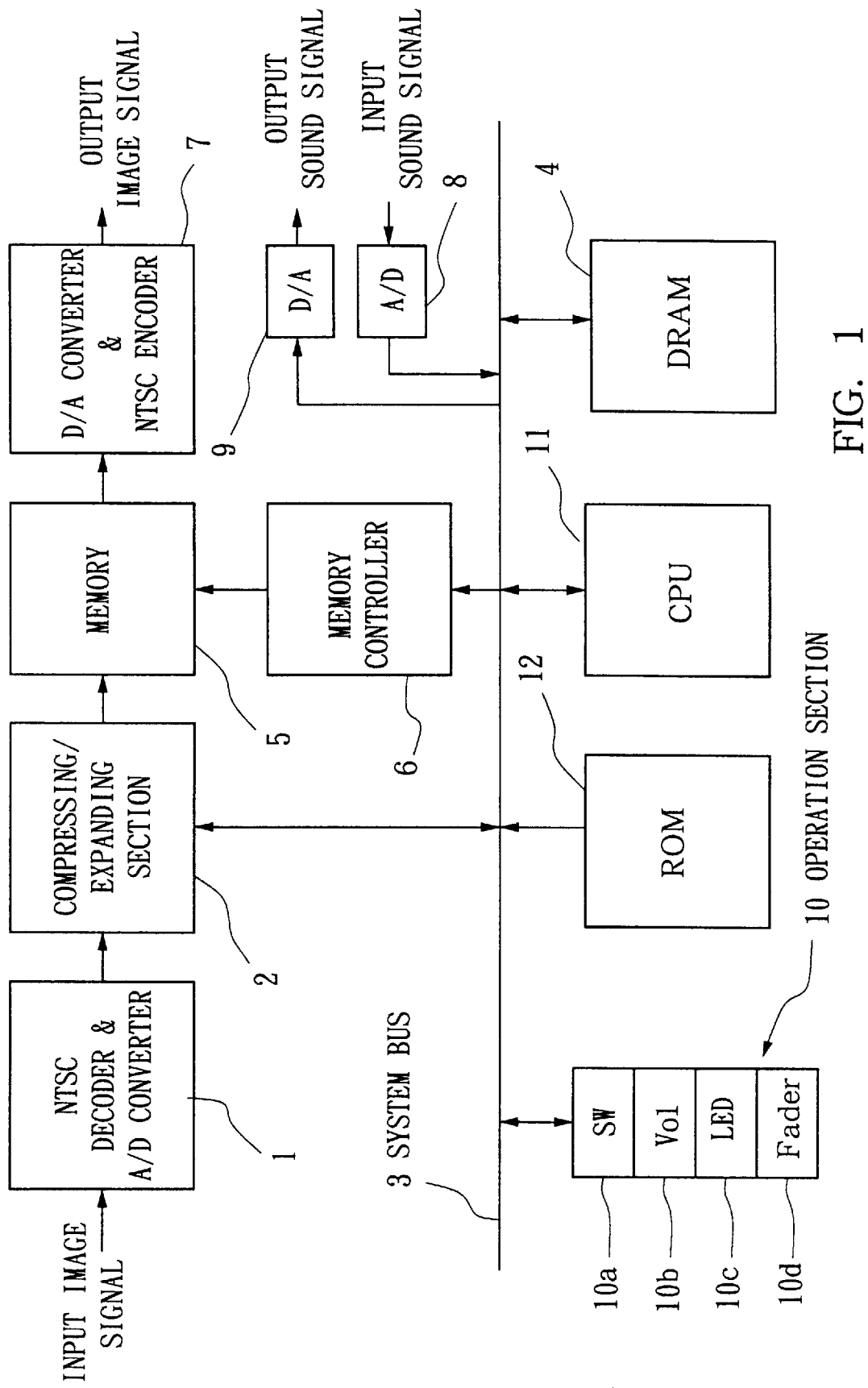
FIG. 1 is a block diagram illustrating a hardware setup of an image recording and reproducing device in accordance with an embodiment of the present invention.

FIG. 1 is a block diagram illustrating a hardware setup of an image recording and reproducing device in accordance with an embodiment of the present invention.

In this image recording and reproducing device, each input image signal conforming to the NTSC standard is first decoded and converted by an NTSC decoder and A/D converter section 1 to provide time-serial digital color image data based on horizontal/vertical scanning. The digital color image data are compressed by a data compressing/expanding section 2 using, for example, the known Motion JPEG (Joint Photographic Coding Experts Group) method. Specifically, the data compressing/expanding section 2 converts the image data, on a frame-by-frame basis, to provide compressed image data (i.e., JPEG bit stream). The compressed image data are transferred via a system bus 3 to a DRAM (Dynamic Random Access Memory) 4 for storage therein. For example, the DRAM 4 has a total storage capacity of 12 Mega bytes and includes an image storage area that is capable of storing up to 450 frames (30 frames per second) of compressed image data and hence storing a dynamic picture for 15 seconds. The image storage area is in the form of a ring buffer, where oldest data are always overwritten by successive image data recording. The image storage, area can be divided into, e.g., two banks A and B and compressed image data of 225 frames (dynamic picture 7.5 sec.) can be independently stored in each of these two banks A and B. The compressed data read out from the DARM 4 are supplied via the system bus 3 to the data compressing/expanding section 2 for expression thereby and then written into a memory 5 of a double buffer structure on a field-by-field basis (first field in 2 fields). Memory controller 6 controls read/write operation of the memory 5. The image data sequentially read out from the memory 5 are converted by a D/A converter and NTSC encoder section 7 into an analog NTSC signal and then provided as an output image signal.

Image information generally is written and read out with one frame covering two fields. As noted above, the present preferred embodiment is designed to increase data storage efficiency by recording only one field of image data as a frame so that the single field is read twice as first and second fields to be output in succession for reproduction.

In the meantime, input stereo sound signals from an external source are converted by an A/D converter 8 into digital representation and then stored into a sound storage area of the DRAM 4 for synchronized readout with the image data. The sound data read out from the sound storage area of the DRAM 4 are output as output sound signals after converted by a D/A converter 9.

Operation section 10 includes various switches 10a, volume controls 10b, LEDs (Light Emitting Diodes) 10c and a fader 10d and sets various operational conditions of the device, such as start/stop of recording and reproduction modes, record and reproduction modes, and recording and reproduction speeds of still and dynamic pictures.

CPU 11 executes overall operations of the image recording and reproducing device. and ROM 12 has prestored therein operation programs and tables for use by the CPU 11.

Figure 2:
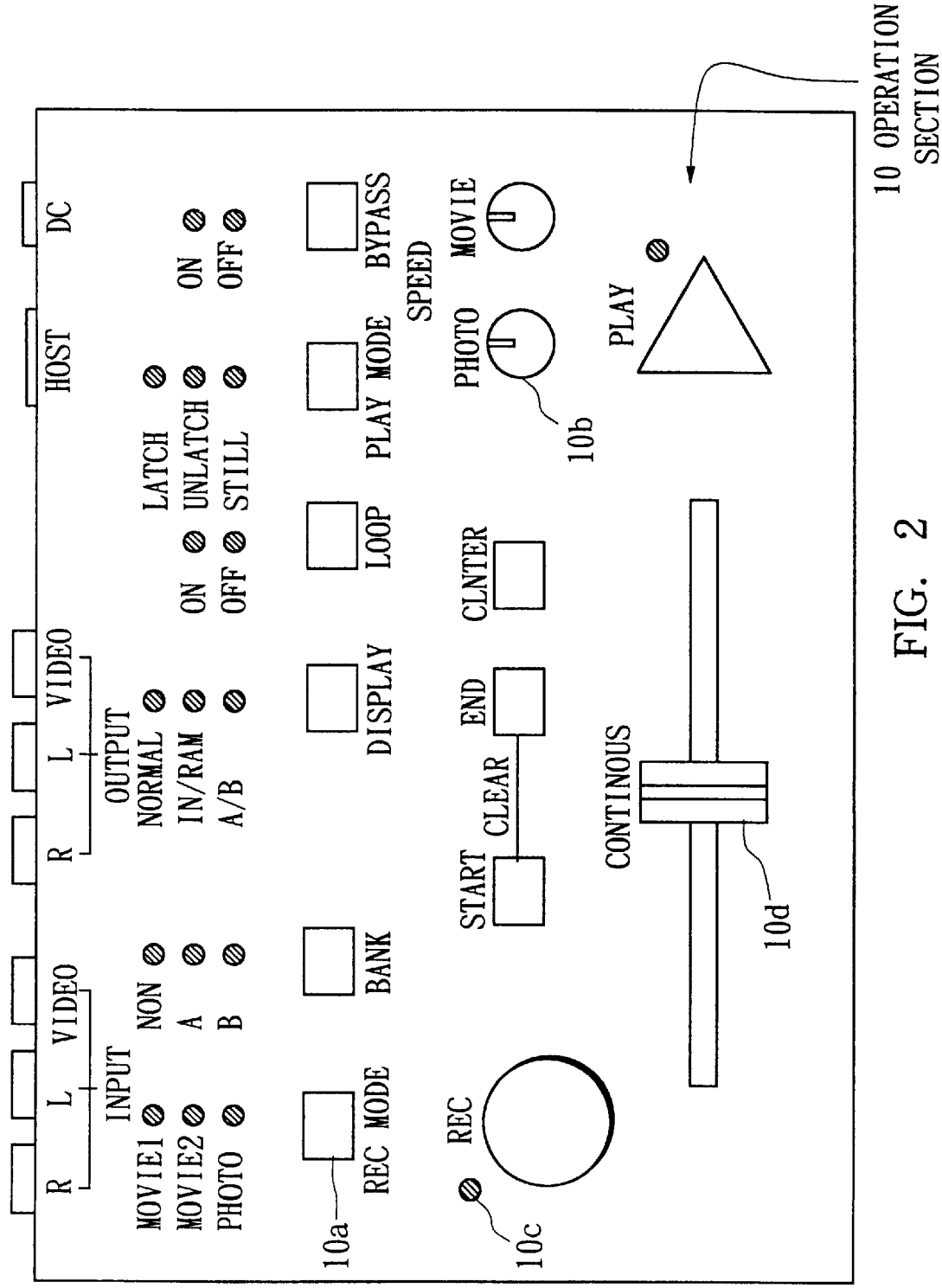
FIG. 2 is a schematic diagram illustrating details of an operation section shown in FIG. 1.

FIG. 2 is a schematic diagram illustrating details of the operation section 10. REC (record) switch and PLAY switch are for instructing a start/stop of recording and reproduction, respectively. REC MODE switch is for selectively setting an operation mode of the REC switch from among a plurality of modes: MOVIE1 mode to allow successive overwrite recording of a dynamic picture; MOVIE2 mode to allow successive recording of a dynamic picture up to a maximum recording time; and PHOTO mode to allow recording of a still picture. In the PHOTO mode, a still picture is recorded in response to each short-time depression of the REC switch, and a continued (long-time) depression of the REC switch causes a plurality of still pictures to be successively recorded at preset time intervals. The PLAY MODE switch is for setting an operation mode of the PLAY switch from among a plurality of modes: LATCH mode in which depression of the PLAY switch starts reproduction and re-depression of the PLAY switch ends the reproduction; UNLATCH mode in which reproduction is maintained during continued depression of the PLAY switch; and STILL mode in which reproduction is advanced by one frame in response to each short-time depression of the PLAY switch and reproduction is advanced successively by a plurality of frames in response to a continued depression of the PLAY switch.

BANK switch determines whether the storage area is used by dividing it into the two banks A and B or not; NON is a mode in which the storage area is used without dividing it; A is a mode in which the bank A is selected; B is a mode in which the bank B is selected. DISPLAY switch is a switch for switching a display mode of an output picture: NORMAL is for a normal output; IN/RAM is for displaying an input image signal on the left side and a reproduced image of the recorded compressed image data on the right side; A/B is a mode for displaying the bank A on the left side and the bank B on the right side.

START and END switches are for instructing a start and end of reproduction, respectively. CENTER switch is for instructing a desired reproduction point. SPEED volume control for MOVIE is for designating a reproduction speed of a dynamic picture, while SPEED volume control for PHOTO is for designating a reproduction speed of still pictures and time intervals in successive recording. CONTINUOUS fader is for manually designating desired reproduction addresses in the image storage area of the DRAM 4 and typically used for manual successive frame advances.

Description will now be made about operations of the image recording and reproducing device of the above described structure.

Figure 3:
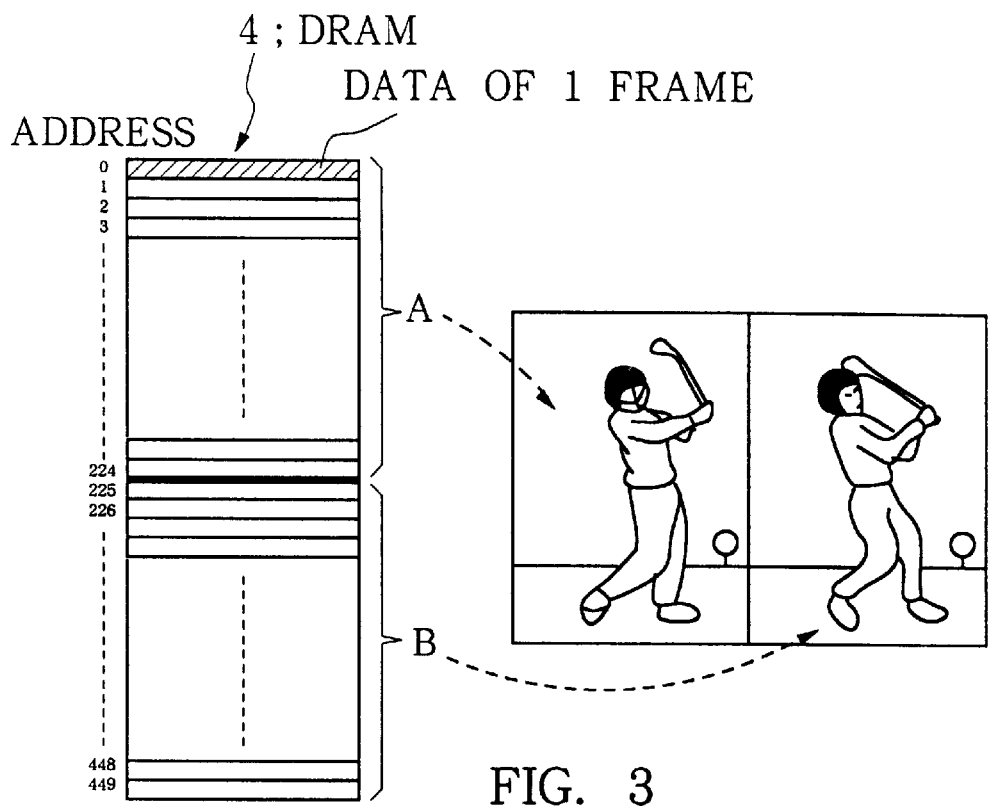
FIG. 3 is a diagram illustrating a storage area of a DRAM of the same device and an example of displayed pictures.

By setting the BANK switch of the operation section 10 to A, the REC MODE switch to MOVIE1 or MOVIE2 and operating the REC switch, the image storage area of the DRAM 4 is divided into the bank A and the bank B and the first dynamic picture image information is recorded in the bank A. Then, by switching the BANK switch to B and operating the REC switch, the second dynamic picture image information is recorded in the bank B. FIG. 3 illustrates an example in which dynamic picture image information of golf swing of a professional golf player taken from a video tape recorder is recorded in the bank A and dynamic picture image information of one's own golf swing taken by a video camera is recorded in the bank B. In each bank, dynamic picture image information for 225 frames, for example, which takes about 7.5 seconds (in case of 30 frames/sec.) is recorded. To use the storage area more efficiently, recording may be made about only the first field of dynamic picture image information recorded in the banks A and B, because, as will be described later, one frame consists of image information of both the banks A and B in the two-picture display.

By setting the DISPLAY switch at A/B mode and depressing the PLAY switch, the dynamic picture image information recorded in the banks A and B are alternately reproduced field by field from respective start addresses 0 and 225 of the respective banks and displayed, as illustrated in FIG. 3, on the left and right sides of the two-divided screen. Since the two pictures were not taken at the same time, timings of these two pictures are not necessarily synchronized.

Therefore, in this device, the reproduction point designation section is constructed of the fader 10d, the START and END switches and the BANK switchs and reproduction timings of the dynamic pictures in the banks A and B can be manually synchronized by means of this reproduction point designation section.

Figure 4:
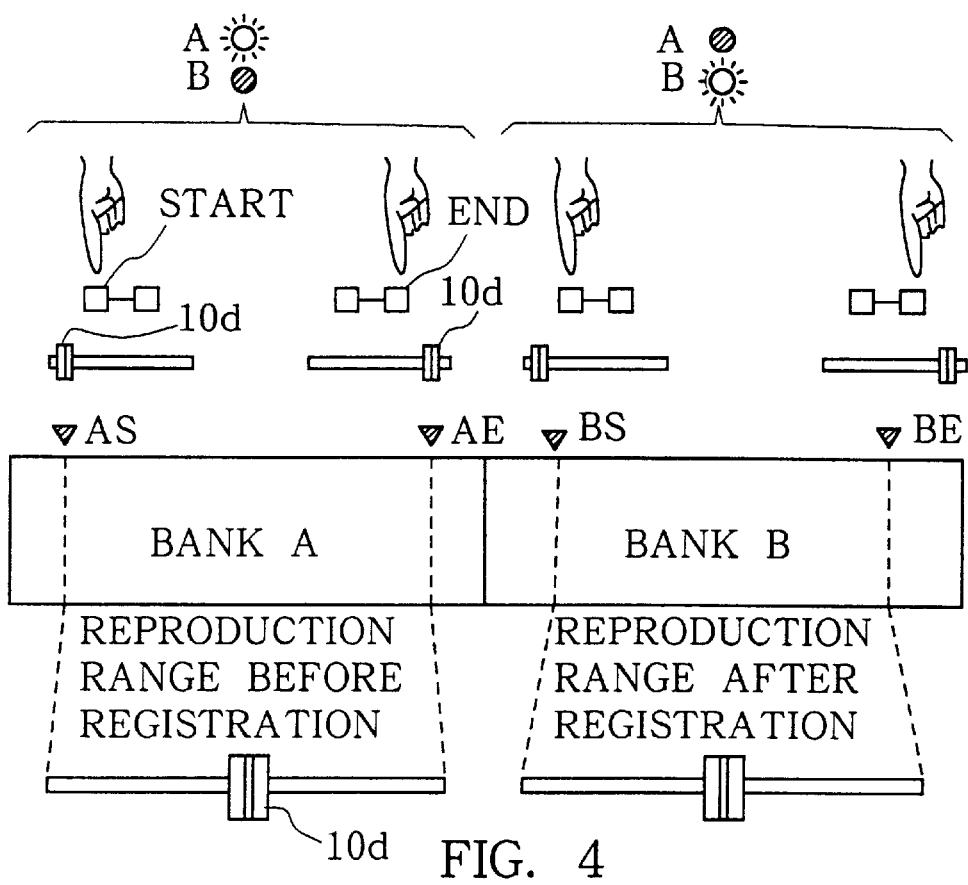
FIG. 4 is a diagram illustrating a manner of setting of a reproduction start address and a reproduction end address of each bank in the same device.

FIG. 4 is a view for explaining how the reproduction point is designated.

First, the BANK switch is set to the bank A. In this state, the operable range of the fader 10d and the entire recording area of the bank A correspond to each other. By operating the fader 10d, the reproduction address and therefore the picture changes successively. Therefore, by operating the fader 10d to set to a picture at which one desires to start reproduction and depressing the START switch, reproduction start address AS of the bank A is stored in a work area of the DRAM 4. Then, by operating the fader IOd to set to a picture at which one desires to end the reproduction and depressing the END switch, reproduction end address AE of the bank A is stored in the work area of the DRAM 4.

Likewise, by setting the BANK switch to the bank B and setting a reproduction start address BS and reproduction end address BE of the bank B by a similar operation, these addresses BS and BE are stored in the work area of the DRAM 4.

Upon completion of registration, as illustrated, the operable range of the fader 10d is alloted to reproduction ranges of the banks A and B starting from the reproduction start addresses AS and BS and ending at the reproduction end addresses AE and BE.

Then, by setting the DISPLAY switch to the A/B mode and depressing the PLAY switch, compressed picture image data is read out field by field alternately from the reproduction start addresses AS and BS of the banks A and B and, after being expanded by the compressing/expanding section 2, are sequentially written in the memory 5 of the double buffer structure and read therefrom sequentially whereby reproduced pictures in multi-picture display can be obtained. Various methods can be conceived for realizing the two-picture display.

The first method is illustrated in FIG. 5A to 5C. As illustrated in FIG. 5A, the field of the bank A is written horizontally skippingly in the first bank of the memory 5 and the field of the bank B is written horizontally skippingly in the second bank of the memory 5. In the reading mode, the data is read out in the order illustrated in FIG. 5B. By this arrangement, a displayed picture of the first field is displayed in such a manner that the picture of the bank A is displayed on the left side and the picture of the bank B is displayed on the right side. As to the second field also, a picture is read out in the same sequence. In this example, the pictures of the banks A and B are reduced in size by half in the horizontal direction but the entire pictures of the banks A and B can be displayed on the same screen.

Figure 6:
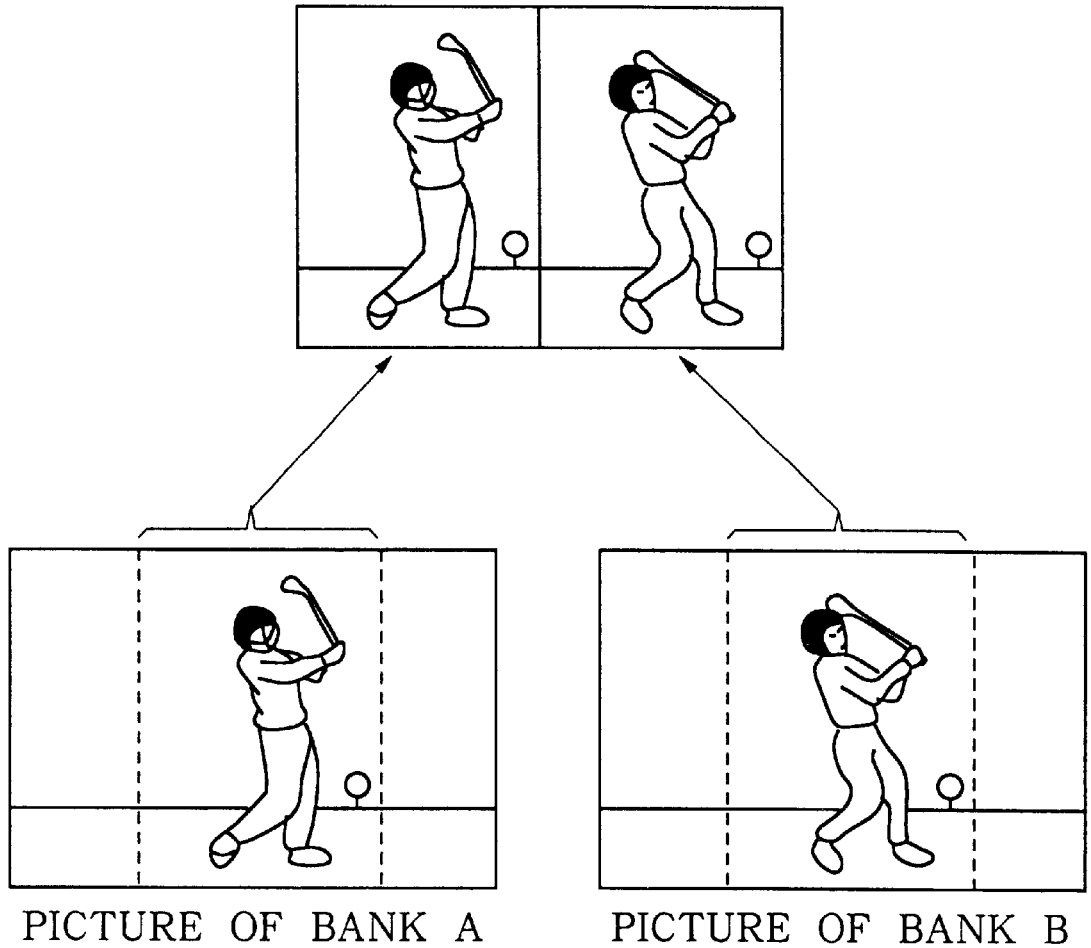
FIG. 6 is a diagram illustrating an example of pictures displayed by the same method.

The second method will now be described. In the second method also, picture data is written as illustrated in FIG. 5A. However, in the second method, only a central portion in the horizontal direction of the field of the bank A is written in the first bank of the memory 5 and only a central portion in the horizontal direction of the field of the bank B is written in the second bank of the memory 5. In the reading mode, data is read out as illustrated in FIG. 5B. By this arrangement, the pictures of the banks A and B are displayed on the left and right sides as illustrated in FIG. 5C but, in this case, as shown in FIG. 6, only the central portions of the pictures of the banks A and B are extracted and displayed on the left and right sides, so that the pictures are displayed without being reduced.

Figure 7:
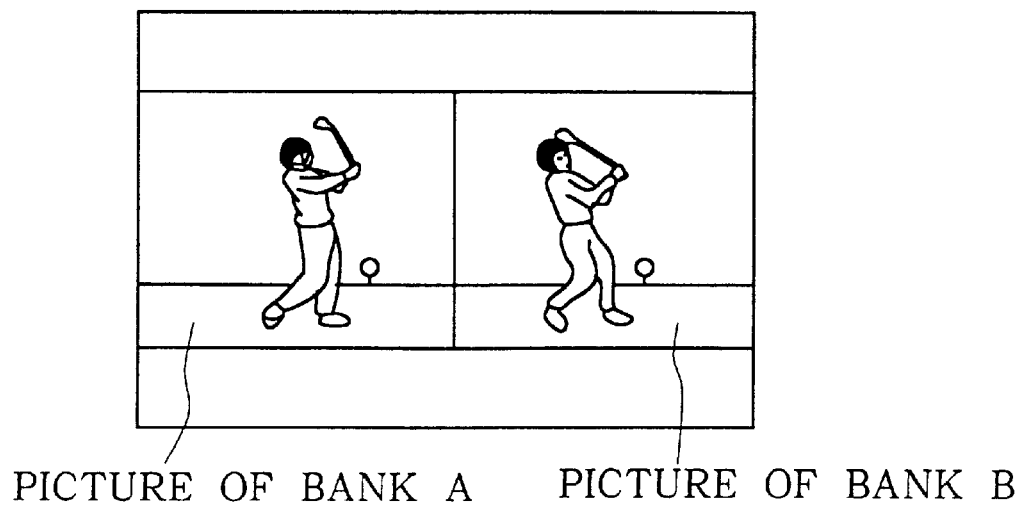
FIG. 7 is a diagram illustrating another example of the multi-picture display.

Alternatively, by reading picture data every other pixel in both horizontal and vertical directions and providing offset at the display start position, pictures which are reduced by half in horizontal and vertical directions as illustrated in FIG. 7 can be displayed on the left and right sides.

These multi-picture display methods can be realized by the read-write control of the memory controller 6.

Figure 8A:
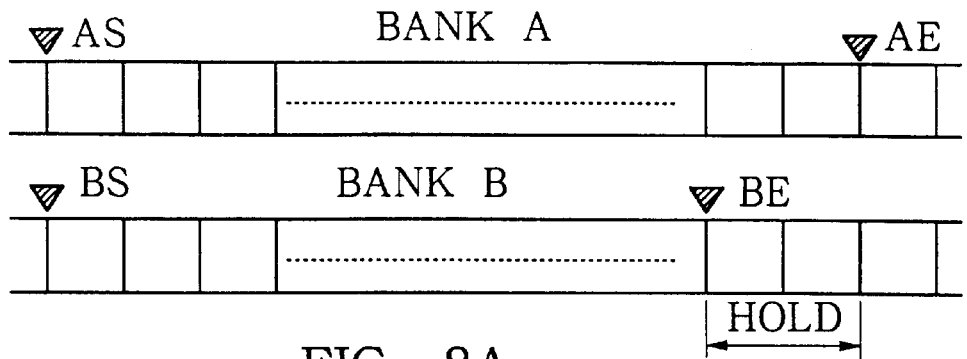
FIGS. 8A to 8C are diagrams illustrating a processing in which reproduction time is different for each bank.
Figure 8B:
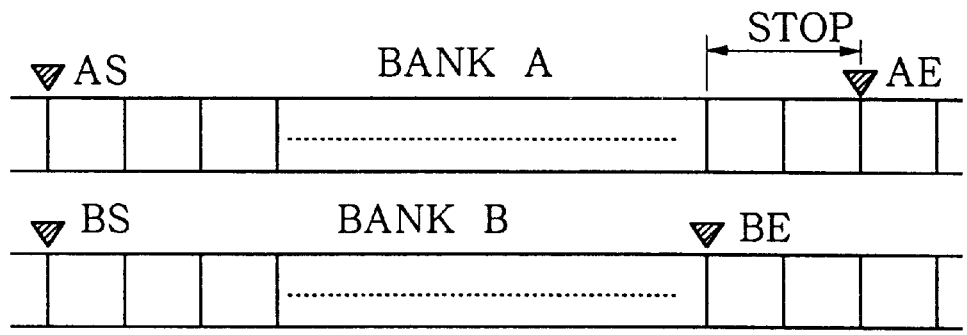
Figure 8C:
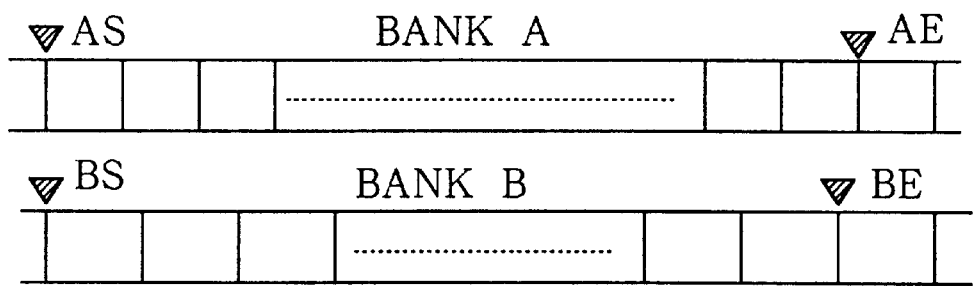

FIGS. 8A to 8C are views explanatory of a processing performed in a case where there is difference in the reproduction time from the reproduction start addresses to the reproduction end addresses of the banks A and B.

FIG. 8A illustrates an example in which when reproduction of the bank B which has a shorter reproduction time is completed, the last picture of the bank B is maintained until reproduction of the bank A which has a longer reproduction time is completed whereby reproduction is made in conformity with the bank of the longer reproduction time. In this case, pictures from the reproduction start address to the reproduction end addresses for all banks can be reproduced so that interruption of reproduction of dynamic pictures of a part of banks will not take place.

FIG. 8B illustrates an example in which when reproduction of the bank B which has a shorter reproduction time is completed, reproduction of the bank A which has a longer reproduction time is simultaneously ended whereby reproduction is made in conformity with the bank of the shorter reproduction time. In this case, reproduction of the bank A is interrupted before it is completed.

FIG. 8C illustrates an example in which reproduction speed of the bank B which has a shorter reproduction time is made lower than reproduction speed of the bank A which has a longer reproduction time so as to match the reproduction time of the banks A and B. This is effective when the form is compared at each timing rather than in terms of the speed of the action.

Figure 9:
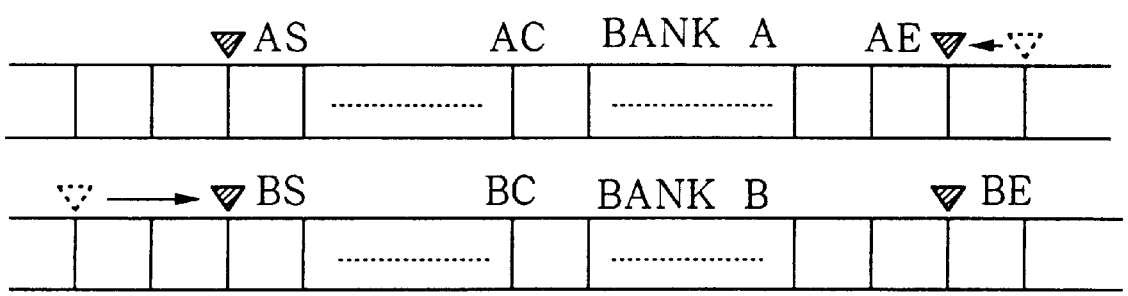
FIG. 9 is a a diagram illustrating an example of a reproduction point setting in another embodiment of the invention.

FIG. 9 illustrates another embodiment of the invention in which a particular reproduction point in banks A and B is matched. After setting a center address AC of the bank A and a center address BC of the bank B, reproduction start addresses and reproduction end addresses are altered so as to conform to one of the banks which has a shorter address difference value between the reproduction start address and the center address. This embodiment is effective when, for example, the instance of baseball batting or impact in a golf swing should be matched between the two pictures.

Figure 10:
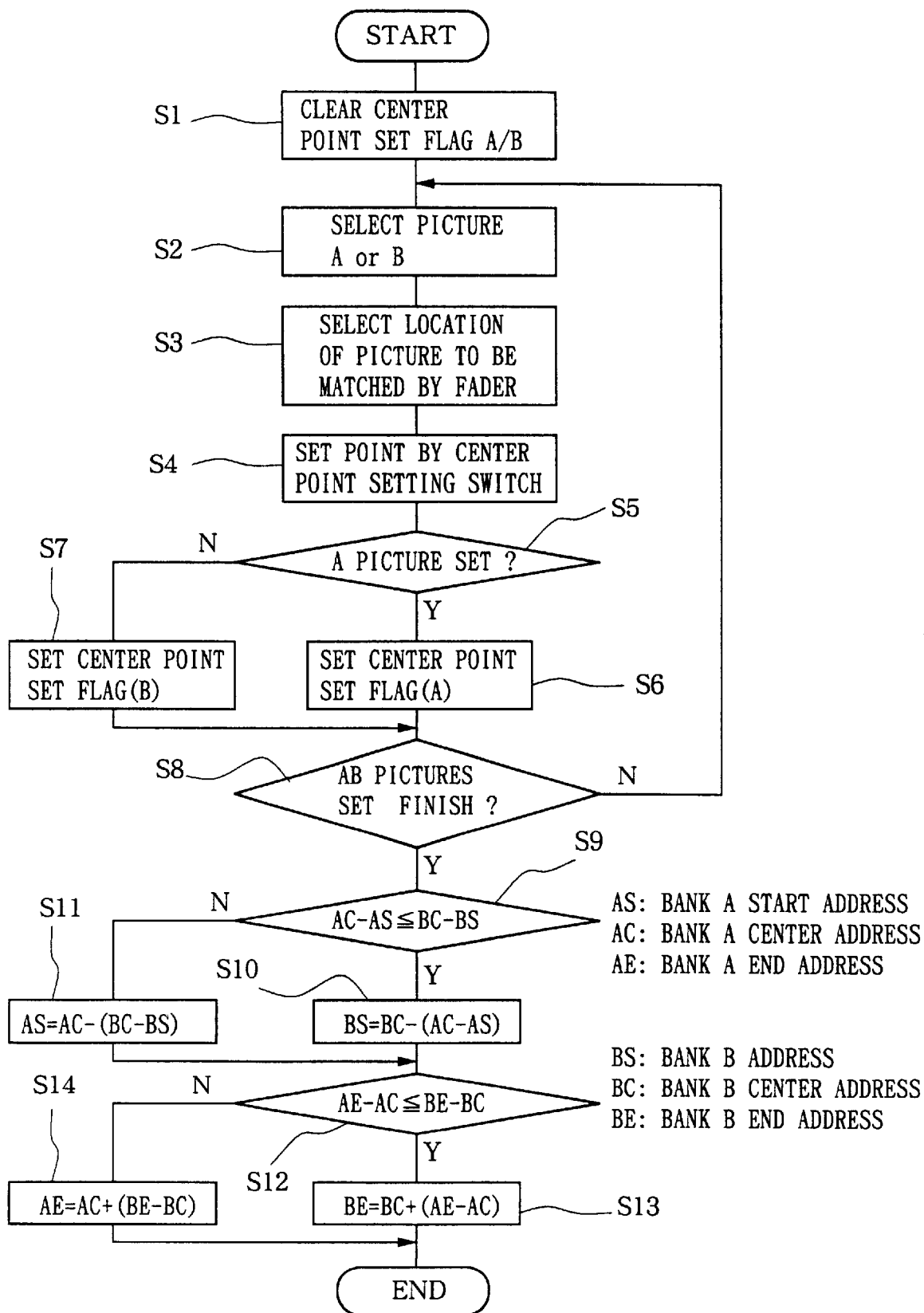
FIG. 10 is a flowchart of a processing shown in FIG. 9.

FIG. 10 illustrates a flowchart of this processing.

First, center point set flag for each of the banks A and B is cleared (S1). Then, either the bank A or B is selected by the BANK switch of the operation section 10 (S2) and the fader 10d is operated to select a picture which one desires to be matched (S3). By depressing the CENTER switch of the operation section 10, its reproduction address is stored in the work area of the DRAM 4 as the center address whereby the center address is set (S4). In case the center point of the bank A has been selected (S5), center point flag of the bank A is set (S6) whereas in case the center point of the bank B has been selected (S5), center point flag of the bank B is set (S7).

Upon setting of the center points of both banks A and B by repetition of steps S2 to S7, an address difference from the reproduciton start address AS to the center address AC of the bank A is compared with an address difference from the reproduction start address BS to the center address BC of the bank B (S9). In case the address difference of the bank B is greater than the address difference of the bank A, the reproduction start address BS is altered by an operation of BS=BC−(AC−AS) so that the address difference of the bank B becomes the same as the address difference of the bank A (S10). In case the address difference of the bank B is smaller than the address difference of the bank A, the reproduction start address AS is altered by an operation AS=AC−(BC−BS) so that the address difference of the bank A becomes the same as the address difference of the bank B (S11).

Then, the address difference from the center address AC to the reproduction end address AE of the bank A is compared with the address difference from the center address BC to the reproduction end address BE of the bank B (S12). In case the address difference of the bank B is greater than the address difference of the bank A, the reproduction end address BE is altered by an operation BE=BC+(AE−AC) so that the address difference of the bank B becomes the same as the address difference of the bank A (S13). In case the address difference of the bank B is smaller than the address difference of the bank A, the reproduction end address AE is altered by an operation AE=AC+(BE−BC) so that the address difference of the bank A becomes the same as the address difference of the bank B (S14).

In the example of FIG. 9, by setting the center addresses AC and BC, the reproduction start address BS of the bank B and the reproduction end address AE of the bank A are altered from the original addresses and, as a result, the reproduction start points AS and BS and the reproduction end points AE and BE are respectively synchronized and the reproduction timings of the center addresses of AC and BC are also synchronized.

Figure 11:
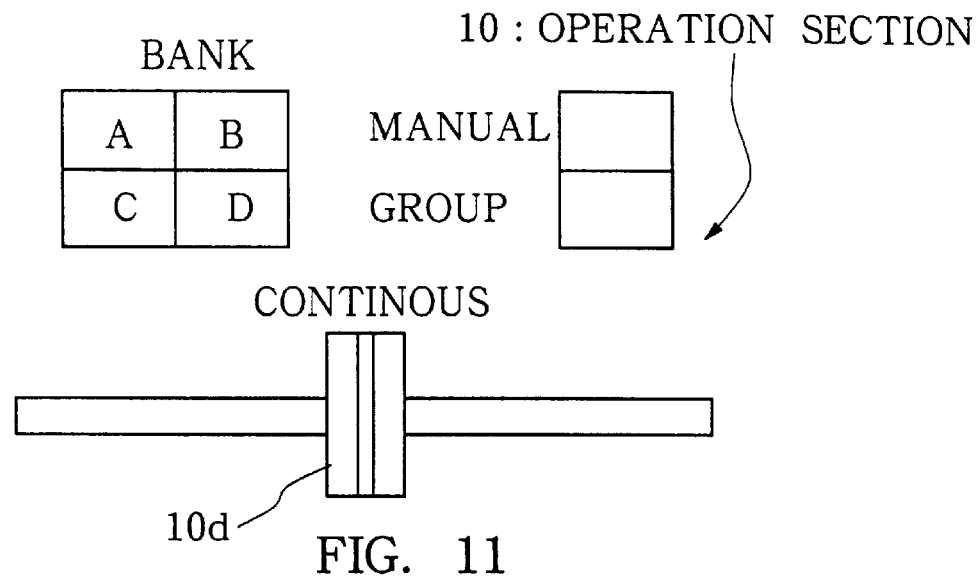
FIG. 11 is a diagram illustrating an essential portion of an operation section in still another embodiment of the invention.
Figure 12A:
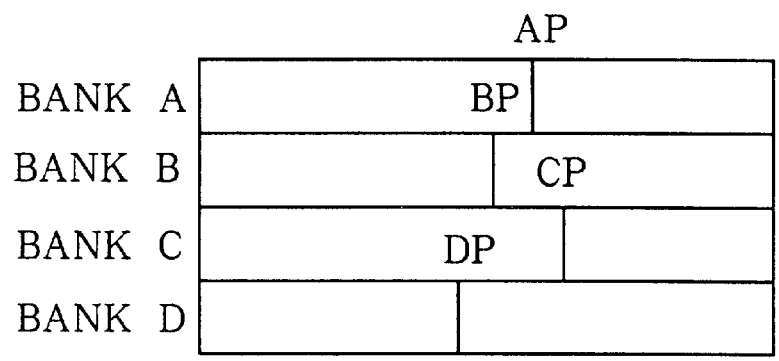
FIGS. 12A and 12B are diagrams explanatory of an operation of the embodiment of FIG. 11.
Figure 12B:
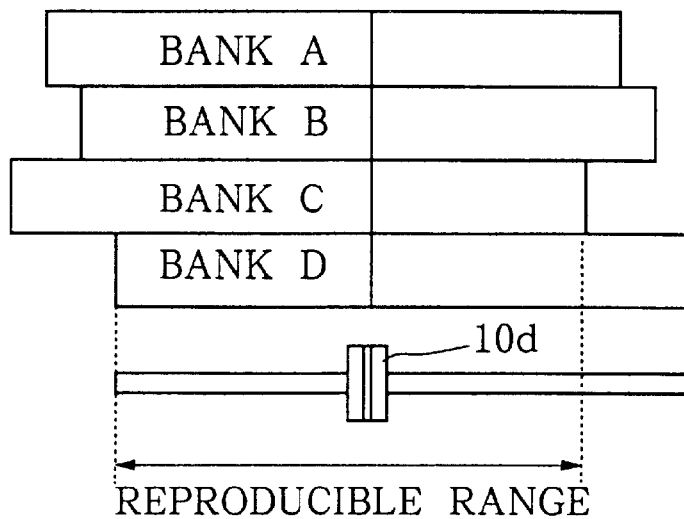

FIG. 11 and FIGS. 12A and 12B illustrate still another embodiment of the invention.

In this embodiment, the image recording and reproducing device has a manual mode and a group mode and performs setting of a reproduction point and a manual reproduction operation with a single fader 10d.

FIGS. 12A and 12B illustrate an essential portion of an operation section 10. In this example, different dynamic picture image information are recorded in four banks A, B, C and D and, for setting reproduction points of these banks, four BANK swistches are provided for selecting one of the banks A, B, C and D. By turning on of the MANUAL switch, manual mode is introduced in which a reproduction address of the bank which has been selected by the BANK switch can be designated by the fader 10d. Now, as illustrated in FIG. 12A, the fader 10d is operated in the state where the bank A has been selected to match the picture to a reproduction point AP. Then, the bank B is selected and the picture is mateched to a reproduction point BP. Likewise, as regards the banks C and D, the pictures are sequentially matched to reproduction points CP and DP.

Upon matching of pictures of all of the banks to particular points by the above operation, the GROUP switch is turned on to set the group mode. In the group mode, as illustrated in FIG. 12B, pictures of all of the banks from the set reproduction point are simultaneously reproduced in accordance with operation of the fader 10d. Accordingly, by moving the fader 10d slowly from the set reproducing point, the four pictures can be compared with one another. If desired, reproduction can be made in reverse direction.

By reproducing plural pictures at a desired speed with a particular reproduction point synchronized in the above described manner, plural pictures can be easily compared and this arrangement is very useful for various analysis of forms and actions.

The processings which the CPU 11 carries out for realizing the above described embodiments are achieved by an image recording and reproducing program and this program is supplied via a recording medium such as a magnetic disk and an optical disk.

The present invention can also be realized by installing an image recording and reproducing program in a computer having units including an image data compressing/expanding board mounted on an expand slot.

Figure 13:
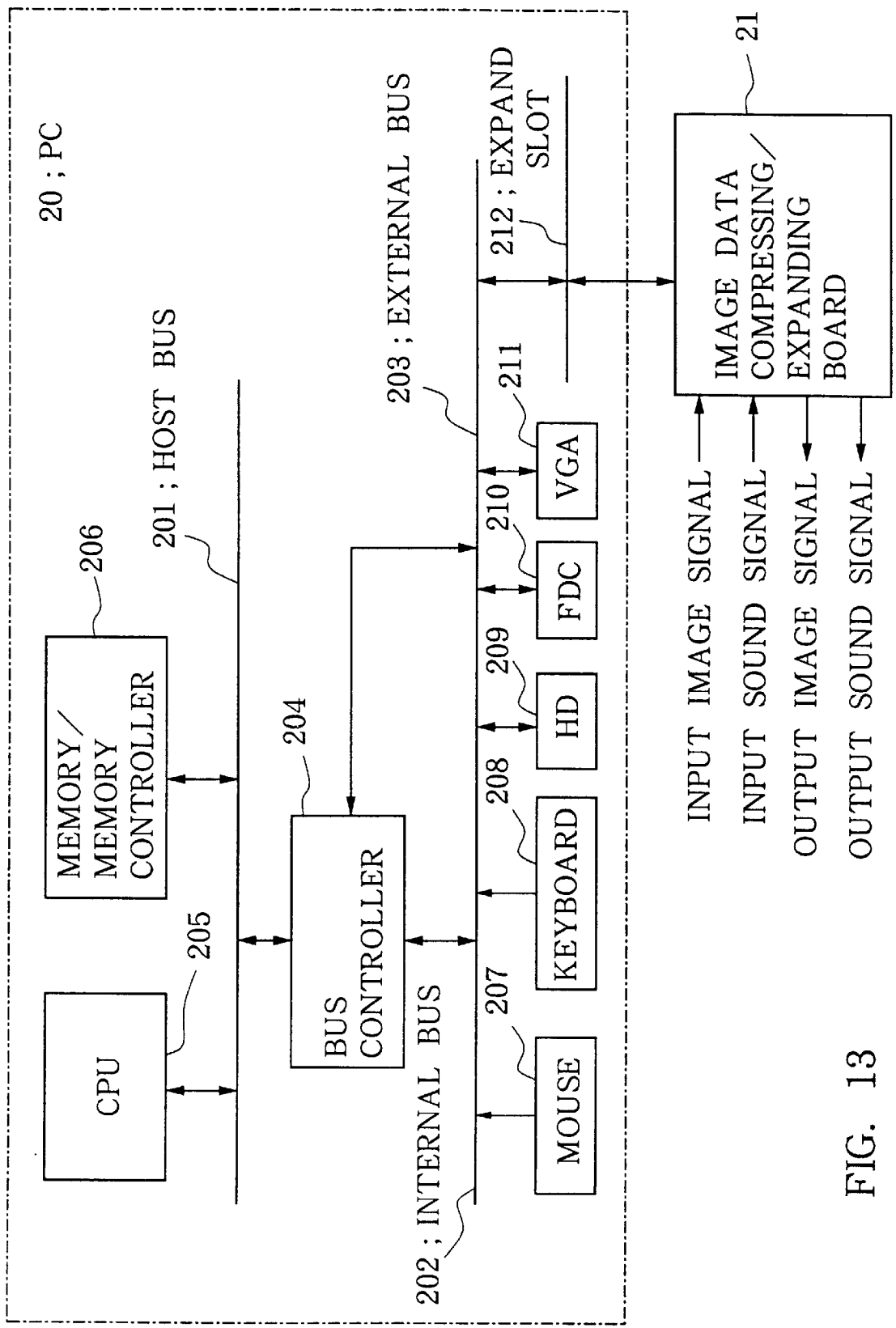
FIG. 13 is a block diagram illustrating a computer system of still another embodiment of the invention.

FIG. 13 is a block diagram illustrating a computer carrying out this embodiment of the invention.

Host bus 201, internal bus 202 and external bus 203 provided in a personal computer PC are interconneced with one another via bus controller 204. To the host bus 201 are connected CPU 205 and memory/memory controller 206. To the internal bus 202 are connected mouse 207 and keyboard 208. To the external bus 203 are connected hard disk device (HD) 209, floppy disk controller (FDC) 210 and video graphic accelerator (VGA) 211. To expand slot 212 which is connected to the external bus 203 is connected image data compressing/expanding board 21.

The image recroding and reproducing program of the invention is installed in the hard disk device 209. This program includes a processing for recording respective dyanamic picture image data in banks which are set in an image storage area of the image data compressing/expanding board 21, a processing for reproducing the recorded dyanmic picture image data under designated conditions and displaying the reproduced data in a divided manner, and a processing for designating a reproduction point of each dynamic picture image data. This program is supplied in the form a suitable recording medium in which the program is recorded or via a communication line. This processing is substantially the same as the one carried out in the embodiment of FIG. 1 except that the mouse 207 and the keyboard 208 are used as the user interface in this embodiment instead of the operation section 10 in FIG. 1.

The image data compressing/expanding board 21 compresses an input image signal and quantizes and codifies an input sound signal and records these signals in a memory area of the board by a recording processing. The image and sound data recorded in the memory area of the image data compressing/expanding board 21 are subjected to expansion of image data, and decoding and reverse quantization of sound data by a reproduction processing and thereafter are displayed on the screen and also output to the outside as an output image signal and an output sound signal from output image signal and output sound signal terminals of the image data compressing/expanding board 21.

Figure 14:
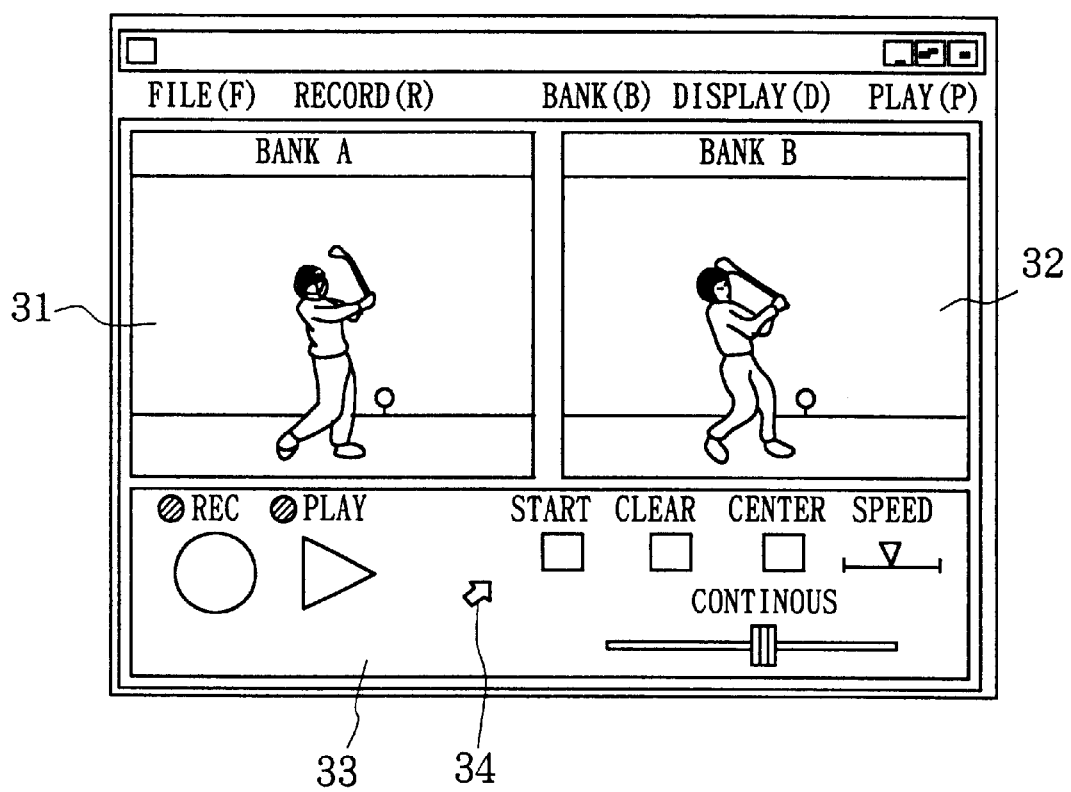
FIG. 14 is a diagram illustrating an example of a picture displayed by the system shown in FIG. 13.

FIG. 14 illustrates an example of the display screen. On the display screen are provided picture display windows 31 and 32 for displaying pictures of respective bands side by side and an operation window 33 for conducting various operations relating to recording and reproducing of image data displayed in these windows 31 and 32. Buttons (icons) displayed on the operation window 33 are substantially the same as those illustrated in FIG. 2 and detailed description thereof will be omitted.

According to this system, pointer 34 on the display screen is moved to a location of a desired button image by movement of the mouse 207 and, by clicking or dragging of the mouse 207, necessary event information is loaded in operation system (OS) and conveyed to an application program via OS to designate a reproduction start address. reproduction end address and desired reproduction point address as well as start of recording and reproduction and reproduction speed etc.

According to this embodiment, a hardware operation section is unnecessary and alteration of the operation section is relatively easy. Further, by loading a compressed image data file through a communication line, this embodiment can be used in such a manner that forms of plural persons playing at different locations can be reproduced with a synchronized timing.

In summary, according to the invention, a plurality of dynamic picture image information can be separately stored in the plurality of storage areas of the image storage section, the plurality of recorded dynamic picture image information can be disposed in different display areas on the same screen and can be reproduced simultaneously, and reproduction points of the respective dynamic picture image information can be timewise matched by the reproduction point designation section with respect to all of the dynamic picture image information. Accordingly, pictures which are related to each other but recorded separately can be displayed side by side on the same screen and can be reproduced simultaneously with a synchronized timing, so that the invention is very useful for various applications including analysis of a form in a sport.

What is claimed is:

1. An image recording and reproducing device comprising:

an image storage section which has a plurality of storage areas and stores dynamic picture image information;

a recording section which records a plurality of dynamic picture image information separately in the storage areas of said image storage section;

a reproducing section which disposes the plurality of dynamic picture image information recorded by said recording section in different display areas and reproduces them simultaneously; and a reproduction point designation section which timewise matches particular reproduction points of the respective dynamic picture image information with respect to all of the dynamic picture image information, wherein said reproduction point designation section designates at least one of a reproduction start address, a reproduction end address and a desired reproduction point address of the respective dynamic picture image information, and wherein said reproduction section simultaneously starts reproduction of the plurality of dynamic picture image information from the reproduction start address of the respective dynamic picture image information designated by the reproduction point designation section and, when there is difference in time length of reproduction between the respective dynamic picture image information, reproduces the dynamic picture image information whose reproduction has been completed as a still picture until reproduction of the dynamic picture image information which has the longest reproduction time is completed.

2. An image recording and reproducing device comprising:

an image storage section which has a plurality of storage areas and stores dynamic picture image information;

a recording section which records a plurality of dynamic picture image information separately in the storage areas of said image storage section;

a reproducing section which disposes the plurality of dynamic picture image information recorded by said recording section in different display areas and reproduces them simultaneously; and a reproduction point designation section which timewise matches particular reproduction points of the respective dynamic picture image information with respect to all of the dynamic picture image information, wherein said reproduction point designation section designates at least one of a reproduction start address, a reproduction end address and a desired reproduction point address of the respective dynamic picture image information and wherein said reproducing section simultaneously starts reproduction of the plurality of dynamic picture image information from the reproduction start address of the respective dynamic picture image information designated by the reproduction point designation section and, when there is difference in time length of reproduction between the respective dynamic picture image information, ends reproduction of all of the dynamic picture image information at a timing when reproduction of the dynamic picture image information which has the shortest reproduction time is completed.

* * * * *